United States Patent [19]

Bard et al.

[11] Patent Number: 5,391,678
[45] Date of Patent: Feb. 21, 1995

[54] CURABLE AND CURED ORGANOSILICON COMPOSITIONS

[75] Inventors: John K. Bard; Richard L. Brady; Raymond T. Leibfried, Sr.; Dekai Loo, all of New Castle County, Del.

[73] Assignee: Hercules Incorporated, Wilmington, Del.

[21] Appl. No.: 983,450

[22] Filed: Dec. 3, 1992

[51] Int. Cl.$^6$ .............................................. C08G 77/04
[52] U.S. Cl. ...................................... 528/25; 528/27; 528/28; 528/31; 528/37
[58] Field of Search ....................... 528/27, 28, 25, 31, 528/37

[56] References Cited

U.S. PATENT DOCUMENTS

| | | | |
|---|---|---|---|
| 5,124,375 | 6/1992 | Leibfried | 523/222 |
| 5,124,423 | 6/1992 | Leibfried | 528/15 |
| 5,128,431 | 7/1992 | Riding et al. | 525/476 |
| 5,171,817 | 12/1992 | Barnum et al. | 528/15 |

FOREIGN PATENT DOCUMENTS

| | | |
|---|---|---|
| 2075469 | 9/1991 | Canada. |
| 482404 | 4/1992 | European Pat. Off.. |
| 479310 | 8/1992 | European Pat. Off.. |

OTHER PUBLICATIONS

Chemical Abstracts, ¶ 193004r, p. 9, vol. 118 (1993) for Japanese Patent Publication No. 04,261,461, published Sep. 17, 1992.
English Language Derwent Abstract for European Patent Application No. 0,179,355.
Dr. John K. Bard; Silicon-Carbon Resins to Boost PWB Use; Jun. 1992 pp. 45–46; p. 48.
Drs. John K. Bard & Richard L. Brady; A New Moisture Resistant Liquid Encapsulant; 1992; pp. 1018–1022.
J. K. Bard, R. L. Brady & J. M. Schwark; Processing and Properties of Silicon-Carbon Liquid Encapsulants.
Drs. John K. Bard & Richard L. Brady; A New Moisture-Resistant Liquid Encapsulant; May 1992; pp. 1–5.
Drs. John K. Bard & Julia S. Burnier; I. New Low Dielectric Constant, Moisture Resistant Resin Technology For High Speed/High Frequency Circuit Board Applications.
Drs. John K. Bard & Julia S. Burnier; II. New High Speed/High Frequency Circuit Board Applications.
Polyclad Laminates, Inc.; PCL–511; Laminates and Prepregs for High Speed Digital Applications.
Research Disclosure; Phosphorus Based Catalyst Retardants For Silicon-Carbon Resin Systems; Jun. 1991.
Research Disclosure; Organosilicon Composition Containing Hydrocarbon Elastomer; Oct. 1991; pp. 799–800.
Research Disclosure; Liquid Encapsulants, Flip Chip Encapsulants and Die Attach Adhesives; Mar. 1992; pp. 184–187.
Research Disclosure; Platinum(II) Complexes As Catalysts For Silicon-Carbon Resin Systems; May 1992; pp. 355–357.
Research Disclosure; Transfer-Molding Compounds for Encapsulation; Sep. 1992 pp. 707–709.

*Primary Examiner*—Melvyn I. Marquis
*Assistant Examiner*—Karen A. Dean
*Attorney, Agent, or Firm*—Robert O'Flynn O'Brien; Mark D. Kuller

[57] ABSTRACT

Curable compositions including epoxy-functional compounds and polyenes, as well as cyclic polysiloxanes, and/or tetrahedral siloxysilanes, and/or linear polysiloxanes; along with, or instead of these polyenes and silicon compositions, crosslinkable prepolymers prepared from such polyenes and silicon compounds may be included. A curing agent, and yet additionally, a curing accelerator, may also be included. These compositions can be thermally cured, in the presence of hydrosilation catalysts.

61 Claims, No Drawings

CURABLE AND CURED ORGANOSILICON COMPOSITIONS

BACKGROUND OF THE INVENTION

1. Field of the Invention

The present invention relates to novel curable and cured organosilicon compositions, and to processes for preparing these compositions.

2. Description of Background and Other Information

LEIBFRIED '779, U.S. Pat. No. 4,900,779, LEIBFRIED '731, U.S. Pat. No. 4,902,731, LEIBFRIED '1134, U.S. Pat. No. 5,077,134, and BARD et al. '360, U.S. Pat. No. 5,008,360, describe crosslinked organosilicon polymers and crosslinkable organosilicon prepolymers comprised of alternating polycyclic hydrocarbon residues and cyclic polysiloxanes or siloxysilane residues linked through carbon to silicon bonds; these patents are incorporated herein in their entireties, by reference thereto. COWAN, U.S. Pat. No. 4,877,820, also incorporated herein in its entirety, by reference thereto, discloses crosslinkable and crosslinked linear poly(organohydrosiloxane) prepolymers and polymers having at least 30% of their hydrosilation reactive ≡SiH groups reacted with hydrocarbon residues derived from polycyclic polyenes.

It has been discovered that the incorporation of epoxy-functional compounds—as well as epoxy-functional compounds together with curing agents, and epoxy-functional compounds together with both curing agents and curing accelerators—with crosslinkable prepolymers such as those discussed above, and in the preparation of crosslinked polymers, such as those discussed above, provides, to the cured compositions, mechanical properties that are superior to the properties which result when such components are not present. The improved mechanical properties include higher modulus, lower thermal expansion, and better adhesion.

SUMMARY OF THE INVENTION

The present invention pertains, in one embodiment, to a curable composition comprising a polyene, a silicon compound, and a compound comprising at least one epoxy functionality. The polyene has at least two hydrosilation reactive carbon-carbon double bonds, while the silicon compound has at least two hydrosilation reactive ≡SiH groups, and comprises at least one member selected from the group consisting of cyclic polysiloxanes, linear polysiloxanes, and tetrahedral siloxysiloxanes; further, at least one, of the polyene and the silicon compound, has more than two hydrosilation reactive sites.

The present invention further pertains, in another embodiment, to a curable composition comprising a crosslinkable organosilicon prepolymer, and the compound comprising at least one epoxy functionality, as discussed above. Preferred such crosslinkable organosilicon prepolymers comprise the hydrosilation reaction products of the polyene and silicon compound, also as discussed above.

The present invention further pertains to a cured composition, resulting from subjecting a curable composition, according to one of the foregoing embodiments, to conditions suitable for crosslinking the polyene and silicon compound (in one embodiment), or for crosslinking the prepolymer (in the other embodiment), and for also effecting ring opening polymerization of the compound comprising at least one epoxy functionality.

The invention still additionally pertains to a process of preparing a cured composition, from a blend comprising the polyene and silicon compound (in one embodiment), or the prepolymer (in the other embodiment), as well as the compound comprising at least one epoxy functionality, and yet further, a hydrosilation catalyst. In this process, the blend is subjected to conditions suitable for crosslinking—or at least substantially crosslinking—the polyene and silicon compound, or the crosslinkable prepolymer, and for effecting ring opening polymerization of the compound comprising at least one epoxy functionality.

DESCRIPTION OF THE INVENTION

The term "polyene," as used herein, refers to molecules having at least two carbon-carbon double bonds.

The term "polymer," as used herein, may encompass prepolymers, such as crosslinkable prepolymers, and polymers, such as crosslinked polymers.

The term "prepolymer", as used herein, refers to any viscous liquid or solid hydrosilation crosslinkable composition that has been partially cured, but has not been cured up to or beyond its gel point (gel point is the point at which a material will no longer flow when heated, and is no longer soluble in organic solvents); typically, having 5% to 80% of the available ≡SiH groups reacted, and, in the case of the poly(organohydrosiloxane) prepolymers, as discussed hereinafter, up to 90% of such groups reacted.

The term "crosslinked polymer", as used herein, encompasses the products of curing hydrosilation crosslinkable compositions, as discussed above with reference to the term "prepolymer", up to or beyond such gel point. This term further encompasses crosslinked polymers, as well as at least substantially crosslinked polymers.

The term "crosslinking", as used herein, particularly in the context of the process of the invention, encompasses the effecting of full crosslinking, as well as the effecting of at least substantial crosslinking.

The polyenes suitable for the invention include those having at least two hydrosilation reactive carbon-carbon double bonds. Preferred among such polyenes are the polycyclic polyenes, including those as disclosed in LEIBFRIED '779, LEIBFRIED '731, BARD et al. '360, and LEIBFRIED '809, U.S. Pat. No. 5,013,809, this last patent being incorporated herein in its entirety, by reference thereto.

Particular appropriate polycyclic polyenes are polycyclic hydrocarbon compounds having at least two non-aromatic carbon-carbon double bonds in their rings. Exemplary compounds include cyclopentadiene oligomers (e.g., dicyclopentadiene, tricyclopentadiene, and tetracyclopentadiene), bicycloheptadiene (i.e., norbornadiene) and its Diels-Alder oligomers with cyclopentadiene (e.g., dimethanohexahydronaphthalene), norbornadiene dimer, hexahydronaphthalene, and substituted derivatives of any of these, e.g., methyl dicyclopentadienes. Dicyclopentadiene (also referred to herein as DCPD) is preferred. Two or more polycyclic polyenes can be used in combination.

The silicon compounds of the invention include those cyclic polysiloxanes, tetrahedral siloxysilanes, and linear polysiloxanes with two or more hydrogen atoms bound to silicon—particularly, with at least two hydrosilation reactive ≡SiH groups. Two or more suitable silicon compounds can be used in combination; particularly, one or more such cyclic polysiloxanes, and/or one or more such tetrahedral siloxysilanes, and/or one or more such linear polysiloxanes, may be employed.

Suitable such silicon compounds include those disclosed in LEIBFRIED '779, LEIBFRIED '731, LEIBFRIED '134, LEIBFRIED '809, COWAN, and BARD et al. '360, and in LAMOREAUX '432, U.S. Pat. No. 3,197,432, LAMOREAUX '433, U.S. Pat. No. 3,197,433, and LAMOREAUX '936, U.S. Pat. No. 3,438,936. These latter three patents are incorporated herein in their entireties, by reference thereto.

Appropriate cyclic polysiloxanes include those having the general formula:

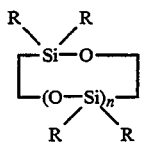

wherein R, which can be the same or different, is hydrogen, or a saturated, substituted, or unsubstituted alkyl or alkoxy radical, or a substituted or unsubstituted aromatic or aryloxy radical, n is an integer from 2 to about 20, and R is hydrogen on at least two of the silicon atoms in the molecule.

The methylhydrocyclosiloxanes (also referred to herein as MHCS), and mixtures thereof, are suitable such cyclic polysiloxanes. Examples include, e.g., tetraoctyl cyclotetrasiloxane, and hexamethyl cyclotetrasiloxane; tetra- and penta-methylcyclotetrasiloxanes; tetra-, penta-, hexa- and hepta-methylcyclopentasiloxanes; tetra-, penta- and hexamethyl-cyclohexasiloxanes, tetraethyl cyclotetrasiloxanes, and tetraphenyl cyclotetrasiloxanes. Preferred are 1,3,5,7-tetramethylcyclotetrasiloxane, 1,3,5,7,9-pentamethylcyclopentasiloxane, and 1,3,5,7,9,11-hexamethylcyclohexasiloxane, or blends thereof.

Most preferably, the silicon compound comprises a plurality of methylhydrocyclosiloxanes. Specifically, in a majority of cases, what is used is indeed a mixture of a number of species wherein n can vary widely, and reference hereinafter to MHCS can refer to such a mixture.

Generally, commercial MHCS mixtures contain up to about 20% (in purer forms, as low as 2%) low molecular weight linear methylhydrosiloxanes, such as heptamethyltrisiloxane, octamethyltetrasiloxane, etc. One suitable commercial mixture is Huls M8830 MHCS, available from Huls America, formerly Petrarch, Bristol, Pa.

The tetrahedral siloxysilanes are represented by the general formula:

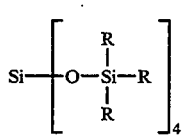

wherein R is as defined above, and is hydrogen on at least two silicon atoms in the molecule.

Examples include, e.g., tetrakisdimethylsiloxysilane, tetrakisdiphenylsiloxysilane, and tetrakisdiethylsiloxysilane. Tetrakisdimethylsiloxysilane is the best known and preferred species in this group.

Appropriate linear polysiloxanes include those having the general formula:

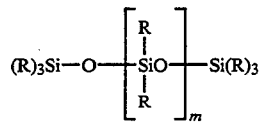

wherein R, which can be the same or different, is hydrogen, or a substituted or unsubstituted saturated alkyl radical, or a substituted or unsubstituted phenyl radical, at least two R's are hydrogen, and m is an integer from about 0 to 1000.

Suitable such linear polysiloxanes include the linear, short chain ≡SiH terminated polysiloxanes having the general formula:

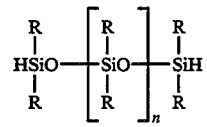

wherein n is 0 to 1000 and R is alkyl or aryl, preferably methyl or phenyl, as disclosed in LEIBFRIED '134 and LEIBFRIED '809.

These linear, short chain ≡SiH terminated polysiloxanes impart flexibility to the cured compositions, and can be used to produce elastomers. As examples of such polysiloxanes, disiloxanes, trisiloxanes, and other short siloxane oligomers, such as hexamethyltrisiloxane, are useful to lower viscosity, particularly for transfer molding operations where low viscosity is most desirable.

Yet additional suitable linear polysiloxanes are the linear poly(organohydrosiloxanes), having the general formula:

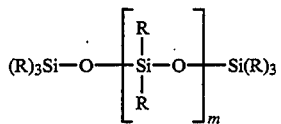

wherein R is a substituted or unsubstituted saturated alkyl radical or a substituted or unsubstituted phenyl radical, and 1%, or about 1%, to 50%, or about 50%, or more preferably 5%, or about 5%, to 50%, or about 50%, of the R's are hydrogen, and m is an integer from 5, or about 5, to 1000, or about 1000, or 3, or about 3, to 100, or about 100, and preferably 5, or about 5, to 100, or about 100, and the maximum value of m is most preferably about 60.

Exemplary linear poly(organohydrosiloxanes) include:
trimethylsiloxy-terminated methylhydropolysiloxane;
trimethylsiloxy-terminated dimethylsiloxanemethylhydrosiloxane copolymer,
dimethylsiloxy-terminated dimethylsiloxanemethylhydrosiloxane copolymer,
dimethylsiloxy-terminated polydimethylsiloxane,
trimethylsiloxy-terminated methyloctylsiloxanemethylhydrosiloxane copolymer, dimethylsiloxy-terminated phenylmethylsiloxanemethylhydrosiloxane copolymer, trimethylsiloxy-terminated methylcyanopropyl-siloxanemethylhydrosiloxane copolymer, trimethylsiloxy-terminated 3,3,3-trifluoropropylmethylsiloxane methylhydrosiloxane copolymer, trimethylsiloxy-terminated 3-aminopropylmethyl siloxanemethylhydrosiloxane copolymer, trimethylsiloxy-terminated 2-phenylethylmethyl siloxanemethylhydrosiloxane copolymer, and trimethylsiloxy-terminated 2-(4-methylphenyl)-ethylmethylsiloxane-methylhydrosiloxane copolymer.

Poly(organohydrosiloxanes) which may be used include those as disclosed in COWAN.

The compounds comprising at least one epoxy functionality (these compounds are also referred to herein as epoxy-functional compounds) include those compounds, e.g., monomers, and resins, having at least one epoxy functional group, and those polymers having epoxy functionality, which will undergo ring opening polymerization through such functional group and functionality; two or more such epoxy-functional compounds may be used in conjunction. Among the epoxy resins which are suitable epoxy-functional compounds are those as disclosed in ZAHIR, U.S. Pat. No. 4,954,580, which patent is incorporated herein in its entirety, by reference thereto.

Among the eligible epoxy-functional compounds are epoxyoctene, butadiene monoxide, 3,4-epoxycyclohexylmethyl-3,4-epoxycyclohexane-carboxylate (available as CY 179 from Ciba Geigy Corporation, Hawthorne, N.Y.), bis(3,4-epoxycyclohexyl)adipate (available as ERL 4299 from Union Carbide Chemicals and Plastics Company, Inc., Danbury, Conn.), and 2-(3,4-epoxycyclohexyl-5,5-spiro-3,4-epoxy)cyclohexane-metadioxane (available as ERL 4234, also from Union Carbide Chemicals and Plastics Company, Inc.).

Additional suitable epoxy-functional compounds are the following:

- epoxy novolac resins, such as glycidyl ethers of phenol-formaldehyde copolymers, preferably in the molecular weight range of about 600–1000 (one such having an average molecular weight of about 680, and being available as DEN 431, from Dow Plastics, The Dow Chemical Company, Midland, Mich.), and such as phenol-dicyclopentadiene copolymers, and glycidyl ethers of cresol-formaldehyde copolymers;
- polyglycol epoxy resins, such as glycidyl ethers of polyalkyloxides;
- cycloaliphatic epoxides, such as vinyl cyclohexene monoxide (VCHO), vinyl cyclohexene dioxide (available as ERL 4206, also from Union Carbide Chemicals and Plastics Company, Inc.), limonene dioxide, vinyl norbornene monoxide, allylglycidylether acrylate, glycidyl acrylate, dicyclopentadiene monoxide, and dicyclopentadiene dioxide;
- glycidyl substituted amines, such as tetraglycidyl methylene dianiline, tetraglycidyl diaminobenzene, N,N,N', N'-tetraglycidyl-4,4'-methylenebisbenzeneamine, and triglycidyl isocyanurate;
- glycidyl ethers of bisphenol A (this glycidyl ether being available as DER 332, also from Dow Plastics, The Dow Chemical Company), tetrabromobisphenol A, and bisphenol F;
- glycidyl ethers of phenol-DCPD copolymers (one such having an average molecular weight of about 620, and being available as Tactix 556, also from Dow Plastics, The Dow Chemical Company); and glycidyl ethers of epichlorohydrin-bisphenol A copolymers.

Epoxy-functional compounds suitable for the invention may further have—in addition to ring opening polymerizable epoxy functional group or functionality, as previously discussed—at least one hydrosilation reactive carbon-carbon double bond. The epoxy-functional compounds which are additionally vinyl—and allylic-functional are included in this category, and certain of the cycloaliphatic epoxides discussed above—i.e., vinyl cyclohexene monoxide, limonene oxide, vinyl norbornene monoxide, allylglycidylether acrylate, glycidyl acrylate, dicyclopentadiene monoxide—are particular examples.

Yet additional epoxy-functional compounds of the invention are the silicon-containing epoxy-functional compounds—i.e., the hydrosilation reaction products, of epoxy-functional compounds having at least one hydrosilation reactive carbon-carbon double bond, as discussed above, with silicon compounds having at least one hydrosilation reactive $\equiv$SiH group. These silicon-containing epoxy-functional compounds include those wherein the silicon compounds have been fully epoxy-substituted—i.e., with each $\equiv$SiH group having been thusly reacted with such epoxy-functional compound—as well as those wherein the silicon compounds have been only partially epoxy-substituted—i.e., having at least one $\equiv$SiH group unreacted with such epoxy-functional compound.

Appropriate epoxy-functional compounds, for preparing these silicon-containing epoxy-functional compounds, include those epoxy-functional compounds having at least one hydrosilation reactive carbon-carbon double bond, as discussed herein. Suitable silicon compounds include cyclic polysiloxanes, tetrahedral siloxysilanes, and linear polysiloxanes, including those as discussed herein.

Included among these yet additional epoxy-functional compounds are the silicon-containing epoxy-functional compounds, e.g., monomers and oligomers, as disclosed in CRIVELLO et al., "The Synthesis, Characterization, and Photoinitiated Cationic Polymerization of Silicon-Containing Epoxy Resins", *Journal of Polymer Science: Part A: Polymer Chemistry*, Vol. 28, pages 479–503 (1990), this article being incorporated herein in its entirety, by reference thereto. Additionally included are the epoxysiloxanes, as identified in ZAHIR.

Particularly preferred are the cyclohexene oxide terminated and glycidyl terminated siloxanes, and the cyclohexene oxide fully and partially substituted, and glycidyl fully and partially substituted, linear and cyclic hydrosiloxanes. Specific examples, of suitable silicon-containing epoxy-functional compounds, are 1,3-bis(3,4-epoxycyclohexylethyl)tetramethyldisiloxane (BTMDS), and 1,3,5,7-tetramethyl-tetrakis(3,4-epoxycyclohexylethyl)cyclotetrasiloxane ($D^{VCHO}_4$), as well as the hydrosilation product of vinylcyclohexene monoxide and methylhydrodimethylsiloxane copolymer (this copolymer being available as PS123.5, from Huls American Inc., Piscataway, N.J.), and the hydrosilation product of vinylcyclohexene monoxide and methylhydrophenylmethylsiloxane copolymer (this copolymer being available as PS129.5, also from Huls American Inc.); these latter two hydrosilation products are also referred to herein as PS123.5-VHCO and PS129.5-

VHCO, respectively. Suitable procedures, for preparing the silicon containing epoxy-functional compounds, include those as disclosed in the CRIVELLO et al. article cited immediately above, as well as in CRIVELLO et al., "Regioselective Ring-Opening Polymerizations and Hydrosilations Catalyzed by Transition Metals", *Macromol. Chem., Macromol-Symp.*, 54/55, pages 189-198 (1992), and in CRIVELLO et al., "Regioselective Rhodium-Containing Catalysts for Ring-Opening Polymerizations and Hydrosilations", *Journal of Polymer Science: Part A: Polymer Chemistry*, Vol. 30, pages 1-11 (1992); these latter two articles are incorporated herein in their entireties, by reference thereto.

The curing agents of the invention are those which facilitate the curing of the epoxy-functional compounds of the invention, and, particularly, facilitate the ring opening polymerization of such epoxy compounds; in a particularly preferred embodiment, such curing agents include those compounds which polymerize with the epoxy-functional compound or compounds, in the ring opening polymerization thereof.

Two or more such curing agents may be used in combination. Suitable curing agents include those as disclosed in ZAHIR.

Among the eligible curing agents are the anhydrides, particularly the polycarboxylic anhydrides, such as nadic anhydride (NA), methylnadic anhydride (MNA), phthalic anhydride, tetrahydrophthalic anhydride, hexahydrophthalic anhydride (HHPA), methyltetrahydrophthalic anhydride (MTHPA), methylhexahydrophthalic anhydride (MHHPA—available from Anhydrides and Chemicals Inc., Newark, N.J.), endomethylenetetrahydrophthalic anhydride, hexachloroendomethylenetetrahydrophthalic anhydride, trimellitic anhydride, pyromellitic dianhydride, maleic anhydride (MA), succinic anhydride (SA), nonenylsuccinic anhydride, dodecenylsuccinic anhydride, polysebacic polyanhydride, and polyazelaic polyanhydride.

Further suitable curing agents are the amines, including aromatic and aliphatic amines, e.g., the aliphatic, cycloaliphatic, aromatic and heterocyclic polyamines; particular suitable examples are 1,4-cyclohexane-bis(-methylamine), 1,3-bis(3-aminopropyl)tetramethyldisiloxane, hexamethylenediamine, triethylenetetraamine, N-aminoethyl piperazine (AEP-available from Aldrich, Milwaukee Wis.), 1,3-diaminobenzene, 1,4-diaminobenzene, 4,4'-diaminodiphenylmethane, and the polyaminosulfones, such as 4-aminophenyl sulfone (4,4'-DDS-also available from Aldrich) and 3-aminophenyl sulfone. Also eligible are the polyols, such as poly(propylene glycol) and poly(vinyl alcohol), phenol-formaldehyde resins (one such resin being the phenol-formaldehyde copolymer having an average molecular weight of about 550-650, and being available as HRJ 2210, from Schenectady Chemicals, Inc., Schenectady, N.Y.), melamine-formaldehyde resins, and urea-formaldehyde resins.

Different commercially available compositions may be used as curing agents in the present invention. These include Ancamide 400, which is a mixture of polyamide, diethyltriamine, and triethylenetetraamine, and Ancamide 506, which is a mixture of amidoamine, imidazoline, and tetraethylenepentaamine; both of these formulations are available from Pacific Anchor Chemical, Performance Chemical Division, Air Products and Chemicals, Inc., Allentown, Pa.

Where curing agent is used, one or more curing accelerators, or catalytic curing agents, may also be present. Suitable curing accelerators include those as disclosed in ZAHIR.

Among the eligible curing accelerators are complexes of amines, particularly dimethylaniline, and also particularly tertiary amines, such as monoethylamine, trimethylamine and octyldimethylamine, with boron trifluoride or boron trichloride; one suitable example is a complex of dimethylaniline and boron trifluoride ($BF_3$.DMA), also available from Aldrich. Also suitable are tertiary amines, such as 1,1'-methylenebis (3-methylpiperidine), dimethylbenzylamine (DMBA), tris-(dimethylaminomethyl)-phenol, hexamethylenetetramine and 1,6-bis-(dimethylamino)-hexane; urea derivatives, such as N-4-chlorophenyl-N',N'-dimethylurea (monuron), N-3-chloro-4-methylphenyl-N',N'-dimethylurea (chlortoluron), N-(2-hydroxyphenyl)-N'-N'-dimethylurea and N-(2-hydroxy-4-nitrophenyl)-N'-N'dimethylurea, and substituted and unsubstituted imidazoles such as imidazole, benzimidazole, 1-methylimidazole, 3-methylimidazole, 2-ethyl-4-methylimidazole, 2-vinylimidazole, 2-phenylimidazole, 2-phenyl-4-methylimidazole, 1-(2,6-dichlorobenzoyl)-2-phenylimidazole, and 1-(2,4,6-trimethylbenzoyl)-2-phenyl imidazole.

With respect to the previously discussed $BF_3$.DMA, this dimethylaniline and boron trifluoride complex can be used as a curing agent, as well as a curing accelerator.

Hydrosilation catalyst is employed, with curable blends of the invention, for effecting the cure thereof, and thereby obtaining the final, cured product. Such catalyst is preferably provided in an amount of about 20–60 ppm, based on the total weight of the curable blend.

The hydrosilation catalysts include metal salts and complexes of Group VIII elements. The preferred hydrosilation catalysts contain platinum (e.g., $PtCl_2$, dibenzonitrile platinum dichloride, platinum on carbon, etc.).

One such platinum catalyst which is suitable, in terms of both reactivity and cost, is chloroplatinic acid ($H_2PtCl_6.6H_2O$); also appropriate are the platinum complex of divinyltetramethyldisiloxane, available as PC075 from Huls America, and the platinum-containing catalysts PC072 (a platinum divinyl complex) and PC085, also available from Huls America. One preferred catalyst is a complex of chloroplatinic acid and dicyclopentadiene, as disclosed, for instance, in LEIBFRIED '779, and in BARD et al. '360.

Also suitable, as hydrosilation catalysts for curable blends of the invention, are those as disclosed in CRIVELLO et al., "Novel Platinum-Containing Initiators for Ring-Opening Polymerizations", *Journal of Polymer Science: Part A: Polymer Chemistry*, Vol. 29, pages 1853-1863 (1991); this article is incorporated herein in its entirety, by reference thereto.

Blends of the invention are preferably curable. Such curable blends can be prepared by any suitable means, such as conventional mixing of the requisite components.

The curing itself is preferably effected thermally. As one suitable method, the curable blend is degassed under vacuum, with heating then being conducted in an inert atmosphere, e.g., under nitrogen.

As a first approach, the curable blend comprises platinum catalyst and the reactants, i.e., including the polyene, silicon compound, epoxy-functional compound, as well as any additional components which may be used, such as the indicated curing agent; where curing agent is present, curing accelerator can likewise be included. These reactants are suitably blended, then subjected to the preceding curing procedure, until the cured product is achieved.

As a second approach, the curable blend comprises prepolymer—preferably, crosslinkable prepolymer, and more preferably, crosslinkable organosilicon prepolymer—and epoxy-functional compound; in a particularly preferred embodiment, the polyene and silicon compound are provided to such curable blend in the form of the indicated crosslinkable organosilicon prepolymer, which has been prepared by hydrosilation, from reactants comprising such polyene and silicon compound. This curable blend, including the platinum catalyst, and such prepolymer, as well as epoxy-functional compound, and any additional components—such as, but not limited to, the curing agent and curing accelerator, as previously discussed, as well as additional polyene and silicon compound—is likewise subjected to the curing procedure.

As discussed herein, the same hydrosilation catalysts previously discussed, as being suitable for curing the curable blends, are likewise appropriate for use in preparation of the prepolymer. With regard to the indicated second approach for effecting curing, if the prepolymer of the curable blend contains a sufficient amount, of the hydrosilation catalyst used in its preparation, to effect curing of such blend, then the cured composition of the invention can be obtained without requiring further addition of hydrosilation catalyst; alternatively, if necessary, the curable blend can be provided with additional hydrosilation catalyst.

The crosslinkable organosilicon prepolymers suitable for the invention include those prepolymers as disclosed in LEIBFRIED '779, LEIBFRIED '731, LEIBFRIED '134, BARD et al. '360, and COWAN. The crosslinkable prepolymers suitable for the invention also include those prepolymers as disclosed in BARD et al. '303, U.S. Pat. No. 5,068,303, BURNIER '048, U.S. Pat. No. 5,025,048, BURNIER '735, U.S. Pat. No. 5,118,735, and in U.S. application Ser. Nos. 593,161 now U.S. Pat. No. 5,242,979, filed Oct. 5, 1990, 593,168 now abandoned, filed Oct. 5, 1990, 685,360 now U.S. Pat. No. 5,171,817, filed Apr. 15, 1991, and 764,746 now U.S. Pat. No. 5,196,498, filed Sep. 24, 1991; these patents and applications are incorporated herein in their entireties, by reference thereto.

Preferred crosslinkable organosilicon prepolymers are those comprising:
(a) at least one polyene having at least two hydrosilation reactive carbon-carbon double bonds; and
(b) at least one silicon compound, having at least two hydrosilation reactive $\equiv$SiH groups, and comprising at least one member selected from the group consisting of cyclic polysiloxanes, tetrahedral siloxysilanes, and linear polysiloxanes;
wherein at least one of the at least one polyene and the at least one silicon compound has more than two hydrosilation reactive sites. Most preferably, the at least one silicon compound has three or more hydrosilation reactive $\equiv$SiH groups.

Suitable polyenes and silicon compounds, for such prepolymers, include those as discussed herein.

Where the crosslinkable prepolymers, of the invention, are the indicated crosslinkable organosilicon prepolymers—i.e., comprising at least one polyene, and one or more one cyclic polysiloxanes, and/or tetrahedral siloxysilanes, and/or linear polysiloxanes, as discussed at length above—the ratio of total hydrosilation reactive carbon-carbon double bonds, contributed thereto by the at least one polyene, to hydrosilation reactive $\equiv$SiH groups, contributed thereto by the at least one silicon compound, is preferably in the range of 0.1:1, or about 0.1:1, to 1.5:1, or about 1.5:1; more preferably, this ratio is in the range of 0.5:1, or about 0.5:1, to 1.2:1, or about 1.2:1; still more preferably, this ratio is in the range of 0.8:1, or about 0.8:1, to 1.2:1, or about 1.2:1. Most preferably, this ratio is 1:1, or about 1:1.

Further as to crosslinkable organosilicon prepolymers of the invention, included among such prepolymers are the crosslinkable linear poly(organohydrosiloxane) prepolymers, comprising linear poly(organohydrosiloxane) with hydrosilation reactive $\equiv$SiH groups having been reacted with polyene—preferably, polycyclic polyene. Suitable polyenes, such as polycyclic polyenes, include those as discussed herein.

In these crosslinkable linear poly(organohydrosiloxane) prepolymers, preferably, 5% to 90%—more preferably, at least 30%, and, most preferably, 30% to 60%—of such hydrosilation reactive $\equiv$SiH groups have been thusly reacted with polyene. Appropriate linear poly(organohydrosiloxanes) for these prepolymers, are those as discussed herein, with both the general formula, and the exemplary linear poly(organohydrosiloxanes), being applicable.

The crosslinkable prepolymers of the invention can be prepared utilizing the procedures and components, including, but not limited to, process steps and catalysts, as set forth in LEIBFRIED '779, LEIBFRIED '731, LEIBFRIED '134, BARD et al. '360, BARD et al. '303, BURNIER '048, BURNIER '735, and COWAN, and in U.S. application Ser. Nos. 593,161 now U.S. Pat. No. 5,242,979, 593,168 now abandoned, and 685,360 now U.S. Pat. No. 5,171,817. The reactions for forming the prepolymer, can be promoted thermally, or by the addition of a hydrosilation catalyst or radical generators such as peroxides and azo compounds.

With respect to hydrosilation catalysts, those disclosed herein for use with the curable blends of the invention, in effecting the cure thereof, are likewise suitable for use in preparation of the prepolymer. For those of such catalysts which are platinum catalysts, catalyst concentrations of about 0.0005 to about 0.05% by weight of platinum, based on the weight of the monomers, are preferred.

One approach for preparing, as the crosslinkable prepolymer of the invention, a crosslinkable organosilicon prepolymer as previously discussed, is simply to mix the correct relative ratios of components—i.e., including the polyene, silicon compound, and platinum catalyst—and bring the mixture to a temperature at which the reaction is initiated. Proper temperature conditions are thereafter maintained, to drive the reaction to the degree of completion requisite for obtaining the desired prepolymer.

In this regard, reaction conditions utilized are those which are requisite for obtaining a prepolymer, within the meaning of the term as defined herein—i.e., such polymer being partially cured, but not cured up to or beyond its gel point; for instance, the mixture of the components is maintained at about 30° to 65° C., for several hours, then interrupted at the point where the requisite proportion of available hydrosilation reactive $\equiv$SiH groups have been reacted—preferably, 5% to 80% thereof. More preferably, this polymerization is effected so that, 30% to 65%, and most preferably, 30% to 50%, of available hydrosilation reactive ≡SiH groups have been reacted.

The indicated preparation of prepolymer can be conducted as a two stage procedure; in such instance, the polyene used, in ultimate preparation of the prepolymer, is itself first prepared in the same manner as the prepolymer. In this regard, such polyene is obtained by heating a mixture of platinum catalyst, silicon compound, and initial polyene—those polyenes discussed herein being suitable as such initial polyene—to effect the hydrosilation reaction; more specifically, the polyene can be prepared in the manner as set forth in LEIBFRIED '134 and LEIBFRIED '809.

For this preparation of the polyene, the relative proportions of initial polyene and silicon compound employed are such that there is a large excess of hydrosilation reactive carbon-carbon double bonds available for reaction with the hydrosilation reactive ≡SiH groups; that is, the ratio of hydrosilation reactive carbon-carbon double bonds of initial polyene, to hydrosilation reactive ≡SiH groups of silicon compound, is between about 2:1 and about 10:1. Excess initial polyene which remains after this reaction is removed by any suitable method, such as conventional stripping—e.g., by distillation under vacuum.

In the resulting polyene, the ratio of total hydrosilation reactive carbon-carbon double bonds, contributed thereto by the initial polyene, to hydrosilation reactive ≡SiH groups, contributed thereto by the silicon compound, is preferably at least 1.8:1, or at least about 1.8:1; more preferably, it is greater than 1.8:1, or greater than about 1.8:1. Still more preferably, this ratio is greater than 1.8:1, or about 1.8:1, and up to 2.2:1, or about 2.2:1; most preferably, it is greater than 1.8:1, or about 1.8:1, and up to 2.0:1, or about 2.0:1.

In the formation of this resulting polyene, the hydrosilation reactive ≡SiH groups, which have been contributed thereto by the silicon compound, are fully, or at least substantially fully, reacted with the hydrosilation-reactive carbon-carbon double bonds which have likewise been contributed by the initial polyene. In this context, "at least substantially fully" means approximately 90%, or more, of the ≡SiH groups have been reacted.

As to such hydrosilation-reactive carbon-carbon double bonds contributed by the initial polyene, those which have not been thusly reacted, with the indicated ≡SiH groups, are available for further hydrosilation. The resulting polyene is accordingly provided with at least two hydrosilation-reactive carbon-carbon double bonds.

This resulting polyene can accordingly be used in preparation of the prepolymer, for such curable blends of the invention which incorporate prepolymer—i.e., for the second approach used to obtain cured product, as previously discussed. Additionally, the resulting polyene is likewise suitable as the polyene, for curable blends of the invention where the prepolymer is not employed—i.e., for the first approach used to obtain cured product, likewise as previously discussed.

Of those hydrosilation reactive carbon-carbon double bonds thusly contributed, but not reacted with the ≡SiH groups, such hydrosilation reactive carbon-carbon double bonds which are part of the thusly reacted initial polyene—which, in turn, is now part of the resulting polyene—will accordingly be available for reaction with hydrosilation reactive ≡SiH groups of further silicon compound, in the second stage of the indicated two stage procedure. This second stage is preparation of the crosslinkable prepolymer, and can be conducted—with such resulting polyene, and such further silicon compound—in the manner for preparing crosslinkable organosilicon prepolymer, as previously discussed.

As to such two stage prepolymer, the ratio of total hydrosilation reactive carbon-carbon double bonds, contributed thereto by such resulting polyene, to hydrosilation reactive ≡SiH groups, contributed thereto by such further silicon compound, will preferably also be the same as previously discussed, with respect to preparation of crosslinkable organosilicon prepolymer—i.e., preferably in the range of 0.1:1, or about 0.1:1, to 1.5:1, or about 1.5:1; more preferably, in the range of 0.5:1, or about 0.5:1, to 1.2:1, or about 1.2:1; still more preferably, in the range of 0.8:1, or about 0.8:1, to 1.2:1, or about 1.2:1; most preferably, 1:1, or about 1:1.

Particularly as to preparing the crosslinkable linear poly(organohydrosiloxane) prepolymer of the invention, as discussed herein, platinum catalyst and polycyclic polyene are mixed and heated to form a complex. This complex and the poly(organohydrosiloxane) are thereafter combined, and, as with respect to the previously discussed organosilicon prepolymer, suitable reaction conditions are utilized to obtain the requisite prepolymer.

Particularly, the reaction mixture is heated to about 40° to 65° C.; as previously discussed with reference to preparation of the organosilicon crosslinkable prepolymer, the reaction temperature is thusly maintained for several hours, then interrupted at the point where the requisite proportion of available hydrosilation reactive ≡SiH groups have been reacted—preferably, for this poly(organohydro-siloxane) prepolymer, 5% to 90% thereof. More preferably, the polymerization is effected so that 30% to 60%, of such available hydrosilation reactive ≡SiH groups, have been reacted.

As to the immediately following discussion, concerning suitable polycyclic polyenes for obtaining the requisite poly(organohydro-siloxane) prepolymer, from the indicated lower temperature reaction, such discussion is provided according to the best understanding of this matter at the present. This discussion is not intended to limit the scope of the invention.

Specifically, so that the requisite poly(organohydrosiloxane) prepolymer, preferably being flowable and heat curable, can be obtained from such lower temperature reaction, even though the ratio of hydrosilation reactive carbon-carbon double bonds to hydrosilation reactive ≡SiH groups is otherwise suitable for obtaining the crosslinked polymer, it appears that an appropriate polycyclic polyene is required; suitable such polycyclic polyenes are those having chemically distinguishable hydrosilation reactive carbon-carbon double bonds, i.e., one such bond being more reactive during hydrosilation than the other (more "electron-rich" and/or less hindered). These polycyclic polyenes include, for example, cyclopentadiene oligomers such as dicyclopentadiene and cyclopentadiene trimer, and methyl dicyclopentadiene.

Yet further components, other than those previously specified, may be included in the invention; such components may be provided to the curable blends of the invention, and/or, where a prepolymer is employed, in preparation of such prepolymer, depending upon the properties of the components and prepolymer. Further as to such additional components, it is understood that those particular additional components, which are specifically discussed, are not provided by way of limitation, and that yet others, not specifically described, may also be suitable.

For instance, what is identified, in U.S. application Ser. No. 764,746 now U.S. Pat. No. 5,196,498, as the at least one second silicon compound, is a suitable such additional component. This component is particularly noted as one which can be provided to curable blends of the invention as a starting material, and/or employed in preparation of prepolymer.

Other yet additional further components include reaction rate modifiers, as disclosed in U.S. application Ser. Nos. 593,168 now abandoned and 764,829 now U.S. Pat. No. 5,340,644.

Still additional further components include flame retardants, as disclosed in U.S. application Ser. No. 893,610, filed Feb. 21, 1992. This application is incorporated herein in its entirety, by reference thereto.

As yet further examples of additional components, carbon (graphite), quartz, aramid, and other polymeric fibers may be included in the curable blends of the invention; these materials are wetted very well by the liquid prepolymers of the invention, making them excellent matrix materials. Fiber can be in non-woven, unidirectional, woven, fabric, etc., form; suitable fibers and prepregs include those as discussed in BARD '360.

Additives such as fillers and pigments are also readily incorporated. Vermiculite, mica, wollastonite, calcium carbonate, sand, silica, fumed silica, fused silica, ceramic beads, hollow glass, glass spheres, glass beads, ground glass, waste glass and other mineral fillers are examples of fillers which can be incorporated. Fillers can serve either as reinforcement or as fillers and extenders to reduce the cost of the molded product; glass spheres, in particular, are useful for preparing low density composites. Fillers can also be used for other reasons, such as viscosity modification. Fillers can be present in amounts up to about 15% by weight of the curable blends of the invention, and in even higher amounts, i.e., up to about 85% by weight, when glass fibers are not used.

Stabilizers (anti-oxidants) are useful to maintain storage stability of the prepolymers, in curable blends of the invention, and thermal oxidative stability, of the finally cured products. Examples include bis(1,2,2,6,6-pentamethyl-4-piperidinyl)-(3,5-di-tert-butyl-4-hydroxybenzyl)butylpropanedioate (available as Tinuvin ™ 144 from Ciba-Geigy Corp., Hawthorne, N.Y.), or a combination of octadecyl 3,5-di-tert-butyl-4-hydroxyhydrocinnamate (also known as octadecyl 3-(3', 5'-di-tert-butyl-4'-hydroxyphenyl) propionate) (available as Naugard ™ 76 from Uniroyal Chemical Co., Middlebury, Conn.) and bis (1,2,2,6,6-pentamethyl-4-piperidinylsebacate) (available as Tinuvin ™ 765 from Ciba-Geigy Corp.). Stabilizers are generally used in an amount of about 0.5% to about 3.0%, based on the weight of the prepolymer of the curable blend. Generally, the stabilizers can be employed as disclosed in BURNIER '048, and in BURNIER '735.

One or more elastomers can also be added to improve toughness. Preferred are hydrocarbon elastomers having a molecular weight of less than 100,000 and low molecular weight siloxane elastomers. Exemplary hydrocarbon elastomers are low molecular weight ethylene-propylene-diene terpolymers, low molecular weight butyl rubber, partially hydrogenated low molecular weight polyisoprene or natural rubber, and partially hydrogenated low molecular weight polybutadiene or styrene-butadiene copolymers. Exemplary siloxane rubbers include low molecular weight vinyl or SiH terminated polydimethyl/diphenyl siloxane copolymers. Preferred are low molecular weight ethylene-propylene-dicyclopentadiene and ethylene-propylene-ethylidenenorbornene polymers having a molecular weight of 5500 to 7000. Most preferred is Trilene 67 elastomer (available from Uniroyal Chemical Co.). The elastomer or elastomers are generally used in an amount of 0.5 to 20%, preferably 3 to 12%, and most preferably 5 to 10%, by weight of the total composition; higher levels may be useful in some applications. Generally, elastomers can be employed as disclosed in U.S. application Ser. Nos. 593,161 now U.S. Pat. No. 5,242,979 and 685,360 now U.S. Pat. No. 5,171,817.

Generally as to the relative proportions and different types of components used in preparing the curable and cured compositions of the invention, these can be determined without undue experimentation, by those of ordinary skill in the art, according to a variety of factors. Such factors include, but are not limited to, the compatibility of such components, whether they will react with one another, and—where they will react with one another—the stoichiometry of the reactions which occur; still additional factors concern the properties desired in the curable blend and cured product.

In this regard, one set of proportions to consider is the ratio of total hydrosilation reactive carbon-carbon double bonds, to total hydrosilation reactive $\equiv$SiH groups, ultimately contributed from all sources—e.g., polyene, silicon compound, and epoxy-functional compound—in preparing the compositions of the invention, whether contributed to preparation of the prepolymer, or to the final, cured product. This ratio is preferably in the range of 0.1:1, or about 0.1:1, to 1.5:1, or about 1.5:1; more preferably, this ratio is in the range of 0.5:1, or about 0.5:1, to 1.2:1, or about 1.2:1; still more preferably, this ratio is in the range of 0.8:1, or about 0.8:1, to 1.2:1, or about 1.2:1. Most preferably, this ratio is 1:1, or about 1:1.

In this regard, where curing agent is employed, the amounts thereof provided are those which are customary in the technology of the epoxy compounds with which they are used. Preferably, the amount of curing agent used is such as to provide about 0.7 to 1.5 equivalents, of curing agent functional groups, to one epoxide equivalent.

More particularly, for amine curing agent, the amount of amine employed is preferably such so as to provide 0.75 to 1.25 equivalents, of amine hydrogen, per epoxide equivalent. In the case of the polycarboxylic anhydrides, the preferred amount of curing agent is such so as to provide 0.4 to 1.1 equivalents, of anhydride groups, per epoxide equivalent.

Curing accelerator is employed to enhance the activity—especially, the curing activity—of the curing agent. As a particularly preferred function, curing accelerator is employed to enhance the participation of curing agent, in the ring opening polymerization of the epoxy-functional compound. The curing accelerators are generally used in proportions of 0.1%, or about 0.1%, to 6%, or about 6%, by weight of the total components in the blend; preferably, the accelerators are thusly employed in catalytic amounts.

Where prepolymer is employed, such prepolymer, and the epoxy-functional compound, may be used in any relative proportions which will allow the cured composition of the invention to be obtained. Preferably, such prepolymer and epoxy-functional compound are employed in any relative proportions in which they are miscible.

In this regard, similarity of chemical structure is a factor which affects the miscibility of multiple components; in this regard, the closer the chemical structure of such components, the less a factor immiscibility will be, in limiting the amount of epoxy-functional compound which can be used with the prepolymer. Accordingly, where the epoxy-functional compound is a silicon containing epoxy-functional compound, similarity in chemical structure, with that of the crosslinkable organosilicon prepolymer of the invention, militates against such a miscibility problem.

Consistent with the foregoing, mixing is especially facilitated, where the silicon substituent, of the silicon containing epoxy-functional compound, is provided by linear and/or cyclic polysiloxane, and the crosslinkable prepolymer is correspondingly derived from linear and/or cyclic polysiloxane. In such instance, the particular closeness in chemical structure, deriving from the siloxane functionality of both, particularly negates immiscibility, as a factor limiting the relative amounts of epoxy-functional compound and prepolymer which can be used together.

Therefore, for silicon containing epoxy-functional compound—particularly, as indicated, where the silicon substituent thereof is provided by linear and/or cyclic polysiloxane, and the crosslinkable prepolymer is correspondingly derived from linear and/or cyclic polysiloxane—any relative proportions of epoxy-functional compound and crosslinkable prepolymer, for obtaining the desired properties of curable blend and/or cured product, can be employed in the blend. For instance, epoxy-functional compound can comprise anywhere from 1% to 99%, and prepolymer can likewise comprise from 1% to 99%, by weight of the epoxy-functional compound/prepolymer total.

However, it is generally the case, with respect to epoxy-functional compounds other than the previously-discussed silicon containing epoxy-functional compounds, that the amount of epoxy-functional compound which can be used, relative to prepolymer, is restricted by the limited miscibility between such two components. This limited miscibility results from the difference in chemical structure, between the epoxy-functional compound and prepolymer; accordingly, if excessive epoxy-functional compound is used, thorough mixing cannot be effected, and the epoxy-functional compound and prepolymer will split into layers.

Taking this factor into account, such epoxy-functional compound is preferably limited to an amount within the range of 5%, or about 5%, to 30%, or about 30%, of the epoxy-functional compound/prepolymer total. More preferably, the range is 10%, or about 10%, to 20%, or about 20%.

With regard to the reactions which occur during curing, the structure of the ensuing product, and the identity of its components, the following discussion—particularly as to the activity of the epoxy-functional compound, curing agent, and curing accelerator, the placement of such epoxy-functional compound and curing agent in the product structure, the configuration of multiple polymers in interwoven relationship, and the composition of such polymers—is provided according to the best understanding of these matters at the present. Such discussion is not intended to limit the scope of the invention.

Curing effects hydrosilation of carbon-carbon double bonds and $\equiv$SiH groups. Where polyene and silicon compound are the starting materials, the reaction will proceed through, if continued for a sufficient amount of time, to the crosslinked polymer; where it is the crosslinkable prepolymer which is employed, it is the as yet unreacted carbon-carbon double bonds and $\equiv$SiH groups thereof which undergo hydrosilation, with the result being further conversion, of the prepolymer, to a crosslinked polymer.

Additionally during curing, the hydrosilation catalyst, and $\equiv$SiH groups provided by silicon compound, and/or crosslinkable prepolymer, and/or crosslinked polymer, together provide a catalyst system for catalyzing yet another reaction—i.e., ring opening polymerization of the epoxy resin.

With such hydrosilation and ring opening polymerization thus simultaneously occurring during the curing procedure, the resulting cured composition accordingly apparently comprises at least two polymers—i.e., the crosslinked polymer, and the ring opening polymerization product—permanently interwoven. Further characteristics, of the cured product, are thought to depend upon certain features of the blend components.

For instance, if the epoxy-functional compound, besides being ring opening polymerizable, is not also reactive with the forming crosslinked polymer—or the components from which it is prepared—then no covalent bonds will form between such epoxy-functional compound and polymer; it accordingly appears that the resulting cured product will be an interpenetrating polymer network—i.e., with the plurality of polymers being only permanently interwoven, and not also linked. Such appears to be the result when the epoxy-functional compound is any one or more of, for instance, 3,4-epoxycyclohexylmethyl-3,4-epoxycyclohexylcarboxylate, bis(3,4-epoxycyclohexyl)adipate, tetraglycidyl methylene dianiline, glycidyl ether of bisphenol A, 1,3-bis(3,4-epoxycyclohexlethyl)tetramethyldisiloxane (BTMDS), and 1,3,5,7-tetramethyltetrakis(3,4-epoxycyclophexlethyl)cyclotetrasiloxane ($D^{VHCO}_4$), or a copolymer of glycidyl ether phenol and DCPD.

However, where the epoxy-functional compound is provided with one or more hydrosilation-reactive carbon-carbon double bonds—such as is the case, for instance, with vinylcyclohexene monoxide, and limonene oxide—it appears that curing will result in the reaction of $\equiv$SiH functionality therewith, as well as the reaction, of such $\equiv$SiH functionality, carbon-carbon double bonds. With the previously discussed ring opening polymerization also taking place during curing, it further appears that the product will accordingly feature, not only the indicated plurality of polymers, permanently interwoven, but also covalent bonding between such polymer resulting from ring opening polymerization, and the crosslinked polymer, derived from the crosslinkable prepolymer and/or polyene and silicon compound.

The ultimate structure, and other properties, of the cured composition, appear also to be affected by such factors as whether additional components—besides polyene and silicon compound, and/or prepolymer, and epoxy-functional compound—are present in the curable blend, as well as what particular combinations of such additional components are utilized. For instance, the presence of curing agent, during ring opening polymerization, can apparently affect what polymerization occurs—depending, e.g., upon what curing agent is employed, and upon whether curing accelerator is also present.

Specifically, where no additional component (e.g., curing agent), capable of polymerizing with the epoxy-functional compound, is present during the ring opening polymerization, then what takes place during such polymerization appears to be only homopolymerization of the epoxy-functional compound, to provide a polyether. In such instance, it further appears that there will accordingly be two interwoven polymers in the cured composition—i.e., the crosslinked polymer, and such polyether.

Of course, if two or more epoxy-functional compounds are employed, then it appears that the ring opening polymerization of epoxy-functional compound is therefore not, strictly speaking, a homopolymerization, while if the epoxy-functional compound also has at least one hydrosilation reactive carbon-carbon double bond, as discussed above, then it appears that the indicated covalent bonding between polymers also takes place. In any event, the polyether would still be provided.

As noted, curing agent is a component whose presence appears to influence the structure of the cured composition. Whether there is indeed any such effect, and what that effect is, appears to depend upon the reactivity of such curing agent, relative to the epoxy-functional compound, in the polymerization, and—if curing accelerator affects this reactivity—upon whether curing accelerator is thusly present.

For instance, where the curing agent employed is only of a certain degree of reactivity—that is, in comparison with the epoxy-functional compound—then it appears that multiple polymerizations occur simultaneously; e.g., both epoxy resin homopolymer, and copolymer of epoxy resin and curing agent, appear to be provided. There will apparently accordingly be three interwoven polymers in the cured composition—i.e., the crosslinked polymer, such homopolymer, and such copolymer.

This appears to be the case where the curing agent used with the epoxy resin is a polycarboxylic anhydride. The epoxy resin apparently both homopolymerizes, to provide a polyether, and copolymerizes with polycarboxylic anhydride, to provide a polyester.

However, for such a curing agent of comparatively lesser reactivity, it appears that the additional presence of curing accelerator can enhance such curing agent's capacity—relative to that of the epoxy resin—for participating in the ring opening polymerization, thereby diminishing the degree of homopolymerization occurring, and correspondingly increasing the degree of copolymerization. If the curing accelerator has sufficient such effect, it appears that its presence can even result in the exclusion, or at least substantial exclusion, of homopolymerization, in favor of the copolymerization. Under the premise that the polymerizations appearing to occur are actually occurring, then, without the polyether which apparently would otherwise have formed, there will be only two interwoven polymers in the cured product.

This appears to be the case where such polycarboxylic anhydride is the curing agent, and an accelerator is employed. It appears that ring opening polymerization results in the polyester, to the exclusion, or at least substantial exclusion, of the polyether.

However, where the curing agent is sufficiently reactive by itself, apparently to compete successfully, with epoxy resin, in the ring opening polymerization thereof, then no curing accelerator is necessary to limit, or even prevent, what appears to be the competing homopolymerization of the epoxy resin, and thereby apparently provide a cured product with two interwoven polymers. This is the case with amine curing agents, whose use will apparently result in a polyamine/polyol copolymerization product, to the exclusion of the polyether homopolymerization product.

The compositions of this invention have utility for electronic applications, e.g., composites, adhesives, encapsulants, potting compounds, and coatings. They are especially useful for the preparation of prepregs and laminates such as those used for printed circuit boards, and glob top encapsulants and molding compounds for encapsulation.

For preparing prepregs and laminates, utilizing compositions of the invention, the procedures as disclosed in BARD et al. '360, in U.S. application Ser. No. 593,168 now abandoned, and in U.S. application Ser. No. 764,829 now U.S. Pat. No. 5,340,044, filed on Sep. 24, 1991, may be employed. This latter application is incorporated herein in its entirety, by reference thereto.

With respect to preparation of prepregs, utilizing curable blends of the invention provided with prepolymer as a starting material, a suitable procedure includes forming the prepreg by impregnating reinforcement fibers (e.g., glass fabric) with the curable blend, or pouring the curable blend over such reinforcement. Then, preferably, the thusly treated reinforcement is cured to the point where the blend of the invention is substantially solid, and, most preferably, also at least substantially tack free; however, prepregs thusly obtained, but which are not tack free, are also within the scope of the invention.

Where the curable blend of the invention utilizes polyene and silicon compound—instead of, or in addition to, prepolymer prepared therefrom, as discussed above—in such prepreg preparation, then this blend is first partially cured, to obtain a liquid (preferably viscous), semisolid, or solid composition. It is this composition which is thusly employed with the reinforcement, with prepreg preparation otherwise being effected according to the procedure set forth above.

In a suitable procedure for obtaining laminates, individual plies of prepregs are stacked, and laminated under heat and pressure, in a hydraulic press. Further cure, of the blend of the invention, is obtained in this treatment.

The invention is illustrated by the following Examples, which are provided for the purpose of representation, and are not to be construed as limiting the scope of the invention. Unless stated otherwise, all percentages, parts, etc. are by weight.

EXPERIMENTAL PROCEDURE

Preparation of Crosslinkable Prepolymer

The prepolymer utilized in Examples 1–20 and 23–45 was prepared according to the following procedure.

60.0 g (1.0 mol of $\equiv$SiH) MHCS, 20 ml of toluene, and 119 $\mu$l (7.5 ppm platinum) of PC072 platinum catalyst (Huls America), were placed in a three-necked 500 ml round bottomed flask, equipped with a condenser and a dropping funnel, and preheated therein to 70° C. To this preheated mixture, a mixture of 66 g of DCPD (1.0 mol of C=C), and 131 $\mu$l (7.5 ppm platinum) of PC072 platinum catalyst, was added dropwise through the dropping funnel, thereby providing a ratio of 1:1, for the hydrosilation reactive ≡SiH groups provided by the MHCS, to the hydrosilation reactive carbon-carbon double bonds provided by the DCPD; during the addition of the DCPD-catalyst mixture, temperature was maintained within a range of 85° to 90° C., by adjusting addition speed.

After addition of the DCPD-catalyst mixture was completed, temperature was maintained at 70° C. for one hour, then allowed to cool to room temperature. After such cooling, 6.63 g of an antioxidant composition—comprising a 38% by weight solution of 5/1 w/w Naugard TM 76/Tinuvin TM 765, in toluene—was added to the mixture.

The prepolymer utilized in Examples 21 and 22 was prepared in the manner as set forth above, except with 50.0 g (0.83 mol of ≡SiH) MHCS, and 50.0 g (0.76 mol of C=C) DCPD thereby providing a 1.1:1 ratio weighted in favor of the ≡SiH groups, in contrast to the previously discussed 1:1 ratio, and resulting in a ≡SiH rich prepolymer. The molar ratio of olefin to ≡SiH was thusly adjusted to compensate for the hydrosilation reactive carbon-carbon double bonds provided by the limonene oxide of Example 21, and by the vinylcyclohexene monoxide of Example 22. The hydrosilation reactive carbon-carbon double bonds provided by each of these epoxy-functional compounds raised the total olefin/≡SiH ratio to 1:1, in both Examples.

Preparation of 1,3-bis (3,4-epoxycyclohexylethyl)tetramethyldisiloxane (BTMDS)

66.0 g of vinylcyclohexene monoxide (VCHO, 0.53 mol) and 20 mg of tris(triphenylphosphine)rhodium chloride were placed in a three-necked 250 ml round bottom flask, equipped with a condenser and a dropping funnel. The flask was then heated to 80° C., after which 33.6 g of 1,1,3,3-tetramethyldisiloxane (0.25 mol) was added dropwise through the dropping funnel; during such addition, the temperature was maintained at 80° C., by adjusting the addition speed. After completion of the 1,1,3,3-tetramethyldisiloxane addition, the reaction mixture was maintained at 40° C. for two hours, by means of an oil bath, then cooled to room temperature. Vacuum distillation of the reaction mixture, to remove excess VCHO, was carried out using a Kugelrohr apparatus, at 60° C., and a vacuum of 1 mm Hg The product, BTMDS (91.0 g, 95%), was collected.

Preparation of 1,3,5,7-tetramethyl-tetrakis (3,4-epoxycyclohexylethyl)cyclotetrasiloxane ($D^{VCHO}_4$)

A solution of 16.0 g of 1,3,5,7-tetramethylcyclotetrasiloxane (D'$_4$, 0.067 mol), in 100 ml of toluene, was placed in a three necked round bottom flask equipped with a condenser, a Dean-Stark trap containing calcium hydride, a drying tube, and a dropping funnel. The solution was refluxed for 1.5 hours, then cooled to 30° C. First, 41.0 g of vinylcyclohexene monoxide (VCHO, 0.33 mol); then 200 μl (30 ppm platinum) of PC072 platinum catalyst (Huls America), were added in through a syringe. Reaction temperature was maintained below 60° C., by means of an external ice bath; when the temperature dropped to room temperature, an oil bath was used to heat the reaction mixture to 40° C., for 1.5 hours. Vacuum distillation of the reaction mixture, to remove excess VCHO, was carried out using a Kugelrohr apparatus, at 60° C., and a vacuum of 1 mm Hg. The product, $D^{VCHO}_4$ (47.1 g 96%), was collected.

Preparation of the hydrosilation product of PS123.5 methylhydrodimethylsiloxane copolymer and vinylcyclohexene monoxide (PS123.5-VHCO)

A solution 45.9 g of methylhydrodimethylsiloxane copolymer (PS123.5) and 0,012 g of tris(triphenylphosphine)rhodium chloride, in 20 ml of toluene, was placed in a three-necked 500 ml round bottom flask, equipped with a condenser and a dropping funnel. The solution was heated to 70° C., after which 15.0 g of vinylcyclohexene monoxide (VHCO) was added dropwise through the dropping funnel. After addition of the VHCO was completed, the solution was kept at 70° C. for two hours, at the end of which time, the solvent was removed by a rotovap. Then, vacuum distillation of the reaction mixture, to remove excess VCHO, was carried out using a Kugelrohr apparatus, at 50° C., and a vacuum of 1 mm Hg. The product, PS123.5-VHCO (56.7 g, 93%), was collected.

Preparation of the hydrosilation product of PS129.5 methylhydrophenylmethylsiloxane copolymer and vinylcyclohexene monoxide (PS129.5-VHCO)

A solution 50.0 g of methylhydrophenylmethylsiloxane copolymer (PS129.5) and 0.022 g of tris(triphenylphosphine)rhodium chloride, in 20 ml of toluene, was placed in a three-necked 500 ml round bottom flask, equipped with a condenser and a dropping funnel. The solution was heated to 80° C., after which 34.6 g of vinylcyclohexene monoxide (VHCO) was added dropwise through the dropping funnel. After addition of the VHCO was completed, the solution was kept at 85°–90° C. for four hours, then heated to reflux at 110° for eight hours, after which the solvent was removed by a rotovap. Then, vacuum distillation of the reaction mixture, to remove excess VCHO, was carried out using a Kugelrohr apparatus, at 50° C., and a vacuum of 1 mm Hg. The product, PS129.5-VHCO (43.8 g, 36.5%), was collected.

Preparation of Cured Composition

Crosslinkable prepolymer and epoxy-functional compound—and, for certain Examples, as indicated below, also curing agent, and, for certain other Examples, yet additionally curing accelerator—were mixed together to form blends; depending upon the Example, either additional catalyst was added to such blend, or curing was effected simply with the catalyst remaining in the prepolymer, from its preparation. These blends were poured into the top slot of 5"×5"×⅛" teflon lined steel molds, and placed under an aspirator vacuum in an oven, to remove air from the blends. The molds were heated in an oven, under cure cycles as specified in the Examples, to provide curing.

Measurements of Properties

As to the data provided hereinafter, dynamic modulus was measured in a Rheometrics Dynamics Spectrometer Model 7700 (Rheometrics Inc., Piscataway, N.J.). A temperature sweep was carried out at a fixed frequency of 10 radians/second.

Thermogravimetric analysis was carried out in a DuPont Thermal Analyzer (E. I. DuPont de Nemours & Company, Inc., Wilmington, Del.) at 20° C./minute.

Thermal Mechanical Analysis and Thermal Expansion Coefficient were measured using a DuPont Thermomechanical Analyzer with a 100 mg load, and expansion probe at 10° C./minute.

The following Examples 1–22 concern preparation of cured compositions from the crosslinkable prepolymer and epoxy-functional compound, without the additional presence of curing agent or curing accelerator; for each of these Examples, the cure cycle was 170° C., 1 hour; 250° C., 4 hours. With respect to Example 10, additional PC072 catalyst, in an amount of 40 ppm of the blend, was added; no such additional catalyst was provided in the remaining Examples 1-9 and 11-22.

The first cure cycle was 125° C., 2 hours; 150° C., 4 hours; 200° C., 2 hours. The second cure cycle was 250° C., 2 hours.

The properties of the resulting cured composition are set forth below, in comparison with corresponding properties of a cured composition prepared from the

| Example | Epoxy-Functional Compound | Prepolymer/ Epoxy-Functional Compound (wt. in g.) | Tg (TMA, °C.) | CTE (ppm/°C.) 60–100° C. | CTE (ppm/°C.) 30–246° C. | RDS Tg (°C.) | RDS G' @ 22° C. (dyne/cm$^2$) | TGA (1000° C. N$_2$, wt % of residue) |
|---|---|---|---|---|---|---|---|---|
| 1 | BTMDS | 13.5/1.5 | not observed | 110 | 125 | 192 | $1.013 \times 10^{10}$ | 44.3 |
| 2 | BTMDS | 12.0/3.0 | 125 | 135 | 147 | — | — | — |
| 3 | BTMDS | 10.5/4.5 | 154 | 157 | 167 | — | — | 33.6 |
| 4 | CY179 | 13.5/1.5 | not observed | 120 | 131 | — | — | 48.1 |
| 5 | CY179 | 12.0/3.0 | 124 | 133 | 153 | 167 | $8.35 \times 10^9$ | 38.5 |
| 6 | CY179 | 10.5/4.5 | 122.6 | 148 | 165 | — | — | 34.7 |
| 7 | DER332 | 12.0/3.0 | not observed | 110 | 117 | −15, 185 | $8.76 \times 10^9$ | 46.1 |
| 8 | D$^{VCHO}$4 | 9.0/1.0 | — | — | — | — | — | — |
| 9 | Tactix 556 | 18.0/2.0 | 150 | 100 | 120 | — | — | — |
| 10 | Tactix 556 | 14.0/6.0 | 99.7 | 95.7 | 107 | — | — | — |
| 11 | ERL 4206 | 18.0/2.0 | — | — | — | — | — | — |
| 12 | ERL 4299 | 18.0/2.0 | 238 | 115 | 130 | — | — | 49.4 |
| 13 | ERL 4299 | 14.0/6.0 | 118.3 | 154 | 173 | — | — | 40.1 |
| 14 | PS123.5-VCHO | 9.0/1.0 | 136.2 | 102 | 151 | — | — | 43.2 |
| 15 | PS123.5-VCHO | 12.0/3.0 | 162.5 | 130 | 161 | — | — | 41.3 |
| 16 | PS129.5-VCHO | 9.0/1.0 | 123.6 | 111 | 150 | — | — | 51.3 |
| 17 | PS129.5-VCHO | 12.0/3.0 | 187.3 | 122 | 143 | — | — | 40.8 |
| 18 | PS129.5-VCHO | 10.5/4.5 | not observed | 140 | 154 | — | — | 37.0 |
| 19 | ERL 4234 | 13.5/1.5 | 148 | 103 | 123 | — | — | 44.5 |
| 20 | DEN 431 | 13.5/1.5 | 142.2 | 107 | 149 | — | — | 52.3 |
| 21 | Limonene Oxide | 15.0/1.7 | 161.2 | 106 | 143 | — | — | 45.0 |
| 22 | VCHO | 15.0/1.4 | 165.0 | 108 | 142 | — | — | 48.0 |

The following Examples 23-37 include epoxy resin curing agent, in addition to the crosslinkable prepolymer and epoxy resin.

prepolymer alone, without epoxy-functional compound or curing agent.

| Examples | Max. cure Temp. (°C.) | RDS Analysis Tg (C.°) | RDS Analysis G' (dyne/cm$^2$) | TGA % residue @ 1000° C./N$_2$ |
|---|---|---|---|---|
| 23 | 150 | 156 | $1.07 \times 10^{10}$ | 51.4 |
|  | 250 | 224 | $9.7 \times 10^9$ |  |
| MHCS/DCPD alone (comparative) | 150 | 163 | $9.4 \times 10^9$ | 51.2 |
|  | 250 | 198 | $9.0 \times 10^9$ |  |

EXAMPLE 23

23.75 g of prepolymer was mixed with 1.25 g of an epoxy formulation—including 0.78 g of tetraglycidyl methylenedianiline as the epoxy-functional compound, and 0.47 g of 4-aminophenyl sulfone as the curing agent, in a 1:1 molar ratio—and with 0.061 g (24 ppm of the blend) of PC075 platinum catalyst (Huls America). This blend, thusly comprising 95% by weight of the prepolymer, and 5% by weight of the epoxy formulation, was cured in two cycles.

The foregoing data indicate that the presence of a mere 5% by wt. epoxy formulation, in the cured composition of Example 23, results in a higher glass transition temperature, and also a higher complex modulus—as determined by dynamic mechanical analysis—than are found in the cured composition prepared without such epoxy resin and curing agent.

EXAMPLE 24

18.0 g of prepolymer, containing 20 ppm of PC072 platinum catalyst (Huls America), was mixed with 1.1 g of ERL 4299 (Union Carbide) and 0.9 g of MHHPA (Anhydrides and Chemicals Inc.). This blend was cured according to the following cure cycle: 170° C., 1 hour; 250° C., 4 hours. The resulting product was found to have the properties as set forth below.

| Tg (°C.) (TMA) | CTE (ppm/°C.) 60–100° C. | CTE (ppm/°C.) 30–246° C. | RDS Analysis Tg (°C.) | RDS Analysis G' (dyne/cm$^2$) @ 22° C. | TGA (% residue @ 1000° C. under N$_2$) |
|---|---|---|---|---|---|
| 180.3 | 97.5 | 127 | 220 | 1.03 × 10$^{10}$ | 48.7 |

In each of Examples 25–37, the curable blend contained 60 ppm of PC072 platinum catalyst, and was thermally cured at 170° C., for one hour, then postcured at 250° C., for four hours. The identities of epoxy resins and curing agents used in the curable blends, and the amounts of prepolymer, epoxy-functional compound, and curing agent, as well as the properties of the resulting cured compositions, are set forth below.

EXAMPLE 38

16.0 g of prepolymer was mixed with 2.3 g of DER 332 (Dow), 1.7 g of MHHPA (Anhydrides and Chemicals Inc.), 0.1 g of DMBA, and 60 ppm of PC072 platinum catalyst (Huls America). This blend was cured according to the following cure cycle: 170° C., 1 hour; 250° C., 4 hours. The resulting product was found to have the properties as set forth below.

| Tg (°C.) (TMA) | CTE (ppm/°C.) 60–100° C. | CTE (ppm/°C.) 30–246° C. | RDS Analysis Tg (°C.) | RDS Analysis G' (dyne/cm$^2$) @ 22° C. | TGA (% residue @ 1000° C. under N$_2$) |
|---|---|---|---|---|---|
| 147 | 88.0 | 129.0 | 132, 190° C. | 1.173 × 10$^{10}$ | 49.4 |

In each of Examples 39–45, the curable blend contained 60 ppm of PC072 platinum catalyst, and was thermally cured at 170° C., for one hour, then postcured at 250° C., for four hours. The identities of epoxy-functional compounds, curing agents, and curing accelerators used in the curable blends, and the amounts of prepolymer, epoxy-functional compound, curing agent, and curing accelerator, as well as the properties of the resulting cured compositions, are set forth below.

| Example | Epoxy-Functional Compound | Curing Agent | Prepolymer/Epoxy-Functional Compound Curing Agent (wt. in g) | Tg (TMA) | CTE (ppm/°C.) 60–100° C. | CTE (ppm/°C.) 30–246° C. | Sample Description |
|---|---|---|---|---|---|---|---|
| 25 | Tactix 556 | MHHPA | 18.0/1.32/0.68 | not observed | 94.6 | 117 | cured |
| 26 | ERL 4206 | MHHPA | 18.0/1.32/0.68 | not observed | 98.2 | 129 | cured, transparent |
| 27 | ERL 4299 | MHHPA | 15.0/2.4/1.4 | 92.9 | 104 | 132 | cured, voids |
| 28 | Tactix 556 | MHHPA | 15.0/2.5/1.3 | 98.9 | 99.8 | 137 | opaque, some voids |
| 29 | PS123.5-VCHO | MHHPA | 13.5/1.13/0.38 | 160.0 | 109 | 148 | opaque, white |
| 30 | PS129.5-VCHO | MHHPA | 9.4/0.6/0.4 | 160.4 | 109 | 137 | hazy |
| 31 | PS129.5-VCHO | MHHPA | 13.2/1.8/1.2 | 146.0 | 114 | 149 | transparent, some voids |
| 32 | DER332 | Ancamide 400 | 13.5/1.5/0.75 | * | * | * | cured, foaming |
| 33 | DER332 | AEP | 13.5/1.5/0.75 | * | * | * | cured, foaming |
| 34 | DER332 | Ancamide 506 | 18.0/1.25/0.75 | * | * | * | cured, voids |
| 35 | DER332 | BF$_3$-DMA | 13.5/1.5/0.75 | 117.6 | 128 | 171 | cured |
| 36 | DER332 | 4,4'-DDS | 18.0/1.5/0.75 | not observed | 100 | 116 | cured, white opaque |
| 37 | DER332 | HRJ2210 | 12.0/2.25/0.75 | 79.9 & 195.5 | 105 | 134 | opaque, yellow |

*Sample is unsuitable for thermomechanical analysis (TMA) due to too many voids.

The following Examples 38–45 include both curing agent and curing accelerator, in addition to the crosslinkable prepolymer and epoxy resin.

| Example | Epoxy-Functional Compound | Curing Agent | Curing Accelerator | Polymer/Epoxy-Functional Compound/Curing Agent/Curing Accelerator (wt. in g) | Tg (TMA) | CTE (ppm/° C.) 60-100° C. | CTE (ppm/° C.) 30-246° C. | Sample Description |
|---|---|---|---|---|---|---|---|---|
| 39 | BTMDS | MHHPA | DMBA | 14.0/3.6/2.4/0.06 | * | * | * | cured, transparent, micro-cracks |
| 40 | ERL 4206 | MHHPA | DMBA | 18.0/1.32/0.68/0.02 | 145.8 | 105 | 143 | cured, transparent |
| 41 | ERL 4299 | MHHPA | DMBA | 15.0/1.05/0.65/0.17 | not observed | 100 | 121 | cured, hazy, voids |
| 42 | Tactix 556 | MHHPA | DMBA | 15.0/1.1/0.6/0.08 | 131.4 | 99.7 | 148.0 | pale brown, hazy |
| 43 | PS123.5-VCHO | MHHPA | DMBA | 13.5/1.13/0.38/0.15 | 125.6 | 118 | 167 | opaque, white to tan |
| 44 | PS129.5-VCHO | MHHPA | DMBA | 14.1/0.9/0.6/0.15 | 122.5 | 112 | 158 | transparent, some voids |
| 45 | PS129.5-VCHO | MHHPA | DMBA | 12.0/1.8/1.2/0.15 | 64.0 | 123 | 217 | transparent |

*Sample is unsuitable for thermomechanical analysis (TMA) due to too many voids.

Finally, although the invention has been described with reference to particular means, materials and embodiments, it should be noted that the invention is not limited to the particulars disclosed, and extends to all equivalents within the scope of the claims.

What is claimed is:

1. A curable composition comprising:
   (a) a polyene having at least two hydrosilation reactive carbon-carbon double bonds;
   (b) a silicon compound, having at least two hydrosilation reactive $\equiv$SiH groups, and comprising at least one member selected from the group consisting of cyclic polysiloxanes, tetrahedral siloxysilanes, and linear polysiloxanes;
   wherein at least one of the polyene and the silicon compound has more than two hydrosilation reactive sites; and
   (c) an epoxy-functional compound.

2. The curable composition of claim 1, wherein the polyene comprises the reaction product of:
   (A) an initial polyene having at least two hydrosilation reactive carbon-carbon double bonds; and
   (B) a silicon compound, having at least two hydrosilation reactive $\equiv$SiH groups, and comprising at least one member selected from the group consisting of cyclic polysiloxanes, tetrahedral siloxysilanes, and linear polysiloxanes;
   wherein the ratio of (i) hydrosilation reactive carbon-carbon double bonds in the initial polyene, to (ii) $\equiv$SiH groups in the at least one silicon compound, is at least about 1.8:1.

3. The curable composition of claim 1, further comprising a hydrosilation catalyst.

4. The curable composition of claim 1, wherein:
   (a) the polyene comprises at least one member selected from the group consisting of polycyclic polyenes;
   (b) the silicon compound comprises at least one member selected from the group consisting of:
      (I) cyclic polysiloxanes having the formula:

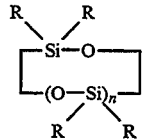

wherein R, which can be the same or different, is hydrogen, or a saturated, substituted, or unsubstituted alkyl or alkoxy radical, or a substituted or unsubstituted aromatic or aryloxy radical, n is an integer from 2 to about 20, and R is hydrogen on at least two of the silicon atoms;

(II) tetrahedral siloxysilanes having the formula:

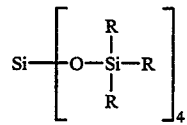

wherein R is as defined above, and is hydrogen on at least two silicon atoms in the molecule; and (iii) linear polysiloxanes having the formula:

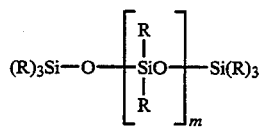

wherein R, which can be the same or different, is hydrogen, or a substituted or unsubstituted saturated alkyl radical, or a substituted or unsubstituted phenyl radical, at least two R's are hydrogen, and m is an integer from about 0 to 1000; and
   wherein the ratio of (i) hydrosilation reactive carbon-carbon double bonds in the polyene, to (ii) $\equiv$SiH groups in the silicon compound, is from about 0.1:1 to about 1.5:1.

5. The curable composition of claim 4, wherein:
   (a) the polyene comprises dicyclopentadiene; and
   (b) the silicon compound comprises a plurality of methylhydrocyclosiloxanes.

6. The curable composition of claim 4, wherein:
(a) the polyene comprises dicyclopentadiene; and
(b) the silicon compound comprises at least one member selected from the group consisting of linear polysiloxanes having the formula:

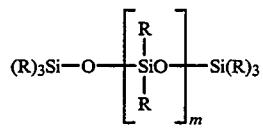

wherein R, which can be the same or different, is hydrogen, or a substituted or unsubstituted saturated alkyl radical, or a substituted or unsubstituted phenyl radical, at least two R's are hydrogen, and m is an integer from about 0 to 1000.

7. The curable composition of claim 1, wherein the epoxy-functional compound further comprises at least one hydrosilation reactive carbon-carbon double bond.

8. The curable composition of claim 1, further comprising a curing agent.

9. The curable composition of claim 8, wherein the curing agent comprises a polycarboxylic anhydride.

10. The curable composition of claim 8, further comprising a curing accelerator.

11. The curable composition of claim 8, wherein the curing agent comprises an amine.

12. A cured composition, resulting from subjecting the curable composition of claim 1 to conditions suitable for crosslinking the polyene and the silicon compound, and for effecting ring opening polymerization of the epoxy-functional compound.

13. The cured composition of claim 12, wherein the polyene comprises the reaction product of:
(A) an initial polyene having at least two hydrosilation reactive carbon-carbon double bonds; and
(B) a silicon compound, having at least two hydrosilation reactive ≡SiH groups, and comprising at least one member selected from the group consisting of cyclic polysiloxanes, tetrahedral siloxysilanes, and linear polysiloxanes;
wherein the ratio of (i) hydrosilation reactive carbon-carbon double bonds in the initial polyene, to (ii) ≡SiH groups in the at least one silicon compound, is at least about 1.8:1.

14. The cured composition of claim 12, wherein:
(a) the polyene comprises dicyclopentadiene; and
(b) the silicon compound comprises a plurality of methylhydrocyclosiloxanes.

15. The cured composition of claim 12, wherein:
(a) the polyene comprises dicyclopentadiene; and
(b) the silicon compound comprises at least one member selected from the group of linear polysiloxanes having the formula:

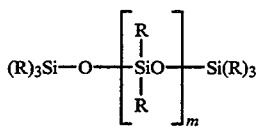

wherein R, which can be the same or different, is hydrogen, or a substituted or unsubstituted saturated alkyl radical, or a substituted or unsubstituted phenyl radical, at least two R's are hydrogen, and m is an integer from about 0 to 1000.

16. The cured composition of claim 12, wherein the epoxy-functional compound further comprises at least one hydrosilation reactive carbon-carbon double bond, the conditions further being suitable for effecting hydrosilation, of this at least one hydrosilation reactive carbon-carbon double bond.

17. The cured composition of claim 12, the curable composition further comprising a curing agent.

18. The cured composition of claim 17, wherein the curing agent comprises a polycarboxylic anhydride.

19. The cured composition of claim 17, the curable composition further comprising a curing accelerator.

20. The cured composition of claim 17, wherein the curing agent comprises an amine.

21. A curable composition comprising:
(a) a crosslinkable organosilicon prepolymer, comprising the hydrosilation reaction product of reactants comprising the following:
(A) a polyene having at least two hydrosilation reactive carbon-carbon double bonds; and
(B) a silicon compound, having at least two hydrosilation reactive ≡SiH groups, and comprising at least one member selected from the group consisting of cyclic polysiloxanes, tetrahedral siloxysilanes, and linear polysiloxanes;
wherein at least one of the polyene and the silicon compound has more than two hydrosilation reactive sites; and
(b) an epoxy-functional compound.

22. The curable composition of claim 21, wherein the polyene comprises the reaction product of:
(A) an initial polyene having at least two hydrosilation reactive carbon-carbon double bonds; and
(B) a silicon compound, having at least two hydrosilation reactive ≡SiH groups, and comprising at least one member selected from the group consisting of cyclic polysiloxanes, tetrahedral siloxysilanes, and linear polysiloxanes;
wherein the ratio of (i) hydrosilation reactive carbon-carbon double bonds in the initial polyene, to (ii) ≡SiH groups in the at least one silicon compound, is at least about 1.8:1.

23. The curable composition of claim 21, further comprising a hydrosilation catalyst.

24. The curable composition of claim 21, wherein:
(a) the polyene comprises at least one member selected from the group consisting of polycyclic polyenes;
(b) the silicon compound comprises at least one member selected from the group consisting of:
(i) cyclic polysiloxanes having the formula:

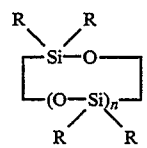

wherein R, which can be the same or different, is hydrogen, or a saturated, substituted, or unsubstituted alkyl or alkoxy radical, or a substituted or unsubstituted aromatic or aryloxy radical, n is an integer from 2 to about 20, and R is hydrogen on at least two of the silicon atoms;
(ii) tetrahedral siloxysilanes having the formula:

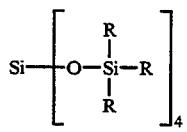

wherein R is as defined above, and is hydrogen on at least two silicon atoms in the molecule; and (iii) linear polysiloxanes having the formula:

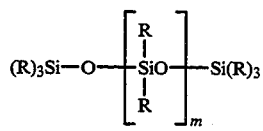

wherein R, which can be the same or different, is hydrogen, or a substituted or unsubstituted saturated alkyl radical, or a substituted or unsubstituted phenyl radical, at least two R's are hydrogen, and m is an integer from about 0 to 1000; and wherein the ratio of (i) hydrosilation reactive carbon-carbon double bonds in the polyene, to (ii) ≡SiH groups in the silicon compound, is from about 0.1:1 to about 1.5:1.

25. The curable composition of claim 24, wherein:
(a) the polyene comprises dicyclopentadiene; and
(b) the silicon compound comprises a plurality of methylhydrocyclosiloxanes.

26. The curable composition of claim 24, wherein:
(a) the polyene comprises dicyclopentadiene; and
(b) the silicon compound comprises at least one member selected from the group consisting of linear polysiloxanes having the formula:

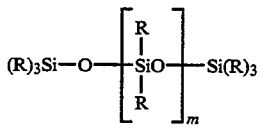

wherein R, which can be the same or different, is hydrogen, or a substituted or unsubstituted saturated alkyl radical, or a substituted or unsubstituted phenyl radical, at least two R's are hydrogen, and m is an integer from about 0 to 1000.

27. The curable composition of claim 21, wherein the epoxy-functional compound further comprises at least one hydrosilation reactive carbon-carbon double bond.

28. The curable composition of claim 21, further comprising a curing agent.

29. The curable composition of claim 28, wherein the curing agent comprises a polycarboxylic anhydride.

30. The curable composition of claim 28, further comprising a curing accelerator.

31. The curable composition of claim 28, wherein the curing agent comprises an amine.

32. A cured composition, resulting from subjecting the curable composition of claim 21 to conditions suitable for crosslinking the crosslinkable organosilicon prepolymer, and for effecting ring opening polymerization of the epoxy-functional compound.

33. The cured composition of claim 32, wherein:
(a) the polyene comprises dicyclopentadiene; and
(b) the silicon compound comprises a plurality of methylhydrocyclosiloxanes.

34. The cured composition of claim 32, wherein:
(a) the polyene comprises dicyclopentadiene; and
(b) the silicon compound comprises at least one member selected from the group consisting of linear polysiloxanes having the formula:

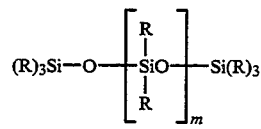

wherein R, which can be the same or different, is hydrogen, or a substituted or unsubstituted saturated alkyl radical, or a substituted or unsubstituted phenyl radical, at least two R's are hydrogen, and m is an integer from about 0 to 1000.

35. The cured composition of claim 32, wherein the epoxy-functional compound further comprises at least one hydrosilation reactive carbon-carbon double bond, the conditions further being suitable for effecting hydrosilation, of this at least one hydrosilation reactive carbon-carbon double bond.

36. The cured composition of claim 32, the curable composition further comprising a curing agent.

37. The cured composition of claim 36, wherein the curing agent comprises a polycarboxylic anhydride.

38. The cured composition of claim 36, the curable composition further comprising a curing accelerator.

39. The cured composition of claim 36, wherein the curing agent comprises an amine.

40. A process for preparing a cured composition from a blend comprising:
(a) a polyene having at least two hydrosilation reactive carbon-carbon double bonds;
(b) a silicon compound, having at least two hydrosilation reactive ≡SiH groups, and comprising at least one member selected from the group consisting of cyclic polysiloxanes, tetrahedral siloxysilanes, and linear polysiloxanes;
wherein at least one of the polyene and the silicon compound has more than two hydrosilation reactive sites; and
(c) an epoxy-functional compound; and
(d) a hydrosilation catalyst;
the process comprising subjecting the blend to conditions for crosslinking the polyene and the silicon compound, and for effecting ring opening polymerization of the epoxy-functional compound.

41. The process of claim 40, wherein the polyene comprises the reaction product of:
(A) an initial polyene having at least two hydrosilation reactive carbon-carbon double bonds; and
(B) a silicon compound, having at least two hydrosilation reactive ≡SiH groups, and comprising at least one member selected from the group consisting of cyclic polysiloxanes, tetrahedral siloxysilanes, and linear polysiloxanes;
wherein the ratio of (i) hydrosilation reactive carbon-carbon double bonds in the initial polyene, to (ii) ≡SiH groups in the at least one silicon compound, is at least about 1.8:1.

42. The process of claim 40, comprising thermally curing the blend.

43. The process of claim 42, further comprising, prior to the step of thermal curing, the step of blending the polyene, the silicon compound, the epoxy-functional compound, and the hydrosilation catalyst.

44. The process of claim 42, wherein the ratio of (i) hydrosilation reactive carbon-carbon double bonds in the polyene, to (ii) ≡SiH groups in the silicon compound, is from about 0.1:1 to about 1.5:1.

45. The process of claim 42, wherein the compound comprising at least one epoxy functionally further comprises at least one hydrosilation reactive carbon-carbon double bond, the conditions further being suitable for effecting hydrosilation, of this at least one hydrosilation reactive carbon-carbon double bond.

46. The process of claim 42, wherein the blend further comprises a curing agent.

47. The process of claim 46, wherein the curing agent comprises a polycarboxylic anhydride.

48. The process of claim 46, wherein the blend further comprises a curing accelerator.

49. The process of claim 46, wherein the curing agent comprises an amine.

50. A process for preparing a cured composition, from a blend comprising:
(a) a crosslinkable organosilicon prepolymer, comprising the hydrosilation reaction product of reactants comprising the following:
a one polyene having at least two hydrosilation reactive carbon-carbon double bonds; and
a silicon compound, having at least one hydrosilation reactive ≡SiH groups, and comprising at least one member selected from the group consisting of cyclic polysiloxanes, tetrahedral siloxysilanes, and linear polysiloxanes;
wherein at least one of the polyene and the silicon compound has more than two hydrosilation reactive sites;
(b) an epoxy-functional compound; and
(c) a hydrosilation catalyst;
the process comprising subjecting the blend to conditions suitable for crosslinking the crosslinkable organosilicon prepolymer, and for effecting ring opening polymerization of the epoxy-functional compound.

51. The process of claim 50, comprising thermally curing the blend.

52. The process of claim 51, further comprising, prior to the step of thermal curing, the step of blending the crosslinkable prepolymer, the epoxy-functional compound, and the hydrosilation catalyst.

53. The process of claim 51, wherein the polyene comprises the reaction product of:
(a) an initial polyene having at least two hydrosilation reactive carbon-carbon double bonds; and
(b) a silicon compound, having at least two hydrosilation reactive ≡SiH groups, and comprising at least one member selected from the group consisting of cyclic polysiloxanes, tetrahedral siloxysilanes, and linear polysiloxanes;
wherein the ratio of (i) hydrosilation reactive carbon-carbon double bonds in the initial polyene, to (ii) ≡SiH groups in the silicon compound, is at least about 1.8:1.

54. The process of claim 53, further comprising, prior to the step of thermal curing, the step of preparing the prepolymer, comprising reacting the polyene and the silicon compound in the presence of a hydrosilation catalyst.

55. The process of claim 54, further comprising, prior to the step of preparing the prepolymer, the step of preparing the polyene, comprising reacting, in the presence of a hydrosilation catalyst:
(a) an initial polyene having at least two hydrosilation reactive carbon-carbon double bonds; and
(b) a silicon compound, having at least two hydrosilation reactive ≡SiH groups, and comprising at least one member selected from the group consisting of cyclic polysiloxanes, tetrahedral siloxysilanes, and linear polysiloxanes;
wherein at least one of the initial polyene and the silicon compound has more than two hydrosilation reactive sites; and
wherein the ratio of (i) hydrosilation reactive carbon-carbon double bonds in the initial polyene, to (ii) ≡SiH groups in the at least one silicon compound, is at least about 1.8:1.

56. The process of claim 51, wherein:
(a) the polyene comprises at least one member selected from the group consisting of polycyclic polyenes;
(b) the silicon compound comprises at least one member selected from the group consisting of:
(I) cyclic polysiloxanes having the formula:

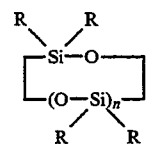

wherein R, which can be the same or different, is hydrogen, or a saturated, substituted, or unsubstituted alkyl or alkoxy radical, or a substituted or unsubstituted aromatic or aryloxy radical, n is an integer from 2 to about 20, and R is hydrogen on at least two of the silicon atoms;

(II) tetrahedral siloxysilanes having the formula:

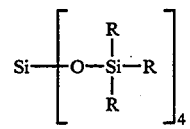

wherein R is as defined above, and is hydrogen on at least two silicon atoms in the molecule; and (III) linear polysiloxanes having the formula:

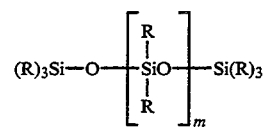

wherein R, which can be the same or different, is hydrogen, or a substituted or unsubstituted saturated alkyl radical, or a substituted or unsubstituted phenyl radical, at least two R's are hydrogen, and m is an integer from about 0 to 1000;

wherein the ratio of (i) hydrosilation reactive carbon-carbon double bonds in the polyene, to (ii) ≡SiH groups in the silicon compound, is from about 0.1:1 to about 1.5:1;

the process further comprising, prior to the step of thermal curing, the step of preparing the prepolymer, comprising reacting the polyene, and the silicon compound, in the presence of a hydrosilation catalyst.

57. The process of claim 51, wherein the epoxy-functional compound further comprises at least one hydrosilation reactive carbon-carbon double bond, the conditions further being suitable for effecting hydrosilation, of this at least one hydrosilation reactive carbon-carbon double bond.

58. The process of claim 51, wherein the blend further comprises a curing agent.

59. The process of claim 58, wherein the curing agent comprises a polycarboxylic anhydride.

60. The process of claim 58, wherein the blend further comprises at least one curing accelerator.

61. The process of claim 58, wherein the curing agent comprise an amine.

* * * * *